United States Patent Office.

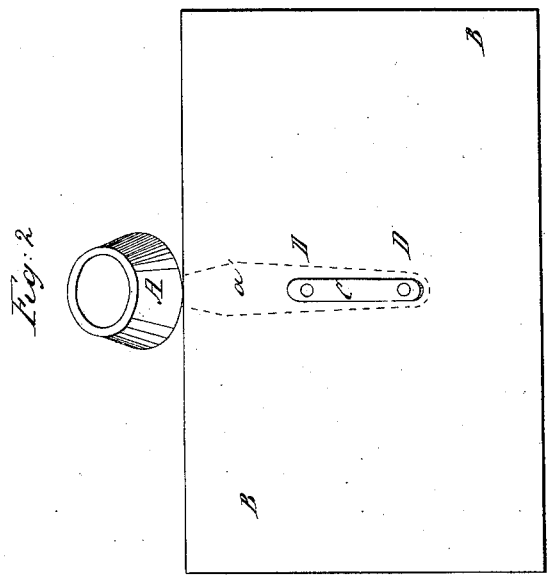
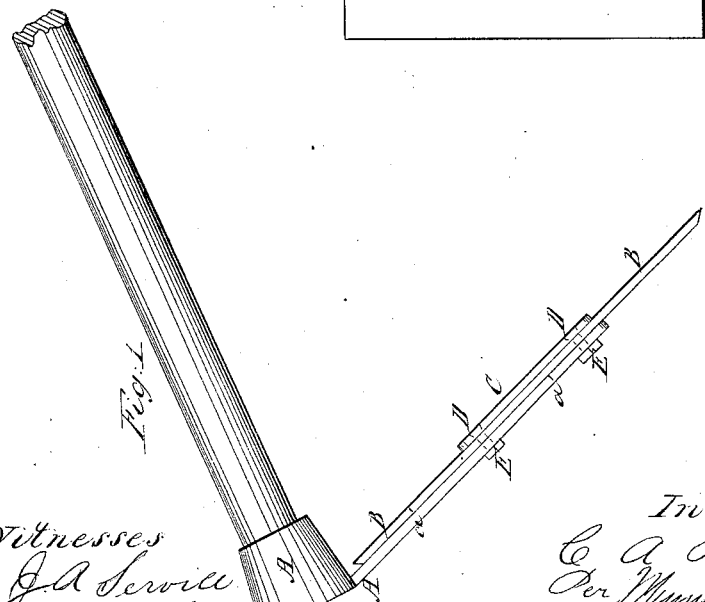

C. A. ROSE, OF COLUMBUS, GEORGIA.

Letters Patent No. 60,941, dated January 1, 1867.

IMPROVEMENT IN HAND HOE.

*The Schedule referred to in these Letters Patent and making part of the same.*

TO ALL WHOM IT MAY CONCERN:

Be it known that I, C. A. Rose, of Columbus, in the county of Muscogee, and State of Georgia, have invented a new and useful Improvement in Weeding or Hand Hoe; and I do hereby declare that the following is a full, clear, and exact description thereof, which will enable others skilled in the art to make and use the same, reference being had to the accompanying drawings, forming part of this specification, in which—

Figure 1 is an edge view of my improved hoe.

Figure 2 is a top view of the same.

Similar letters of reference indicate like parts.

My invention has for its object to furnish an improved hoe, the blade of which is removable from the eye, and is so formed that when one side or edge becomes worn, it may be removed and reversed, so that one blade may last as long as two ordinary hoes.

A is the eye of the hoe, through which the handle is passed and securely wedged in place, in the ordinary manner. One side of the eye A is extended out into an arm, $a'$, to which the blade B of the hoe is bolted. B is the blade of the hoe, upon both the upper and lower edges of which are formed cutting edges, as shown in fig. 1. C is a short bar placed upon the upper side of the blade B, just above and parallel with the lower part of the arm $a'$, of the eye A, as shown in figs. 1 and 2. This bar has holes made through it for the passage of the bolts D, which said holes are countersunk so that the heads of said bolts may be flush with the upper surface of the said bar C. The blade B is clamped between the arm $a'$ and the bar C, and is secured in place by the bolts D and nuts E. The size and weight of the blade B will depend upon the use to which the hoe is to be applied; and when the said blade is sufficiently heavy, the bar C may be dispensed with, and the blade bolted directly to the arm $a'$ of the eye A. By this construction, whenever one side or edge of the blade has become worn, the blade may be removed and reversed, and the other edge used; and when one blade has been worn out a new one may be attached to the same eye. And when either the eye or blade may be broken, the broken part may be replaced with a new one without its being necessary to have the entire hoe new.

I claim as new, and desire to secure by Letters Patent—

1. Making the eye A and blade B separate, and securing them to each other by bolts and nuts, substantially as herein shown and described.

2. Making the blade B of the hoe reversible, and with two cutting edges, substantially as herein shown and described.

C. A. ROSE

Witnesses:
 WARREN ANDREWS,
 THOMAS W. GRIMES, Jr.